INVENTOR
W. D. LEWIS
BY
Alan C. Rose
ATTORNEY

July 10, 1962 W. D. LEWIS 3,044,017

MICROWAVE CARRIER LOGIC CIRCUITS

Filed Dec. 31, 1956 4 Sheets-Sheet 2

INVENTOR
W. D. LEWIS
BY Alan C. Rose
ATTORNEY

MICROWAVE CARRIER LOGIC CIRCUITS

INVENTOR
W. D. LEWIS
BY Alan C. Rose
ATTORNEY.

July 10, 1962 W. D. LEWIS 3,044,017

MICROWAVE CARRIER LOGIC CIRCUITS

Filed Dec. 31, 1956 4 Sheets-Sheet 4

INVENTOR
W. D. LEWIS
BY Lucian C. Canepa
ATTORNEY

United States Patent Office 3,044,017
Patented July 10, 1962

3,044,017

MICROWAVE CARRIER LOGIC CIRCUITS

Willard D. Lewis, Mendham, N.J., assignor to Bell Telephone Laboratories, Incorporated, New York, N.Y., a corporation of New York

Filed Dec. 31, 1956, Ser. No. 631,859
2 Claims. (Cl. 328—92)

This invention relates to high speed digital data processing apparatus in which digital information is represented by microwave signals.

In serial binary computers, digits are characteristically represented by signals occurring in specific time slots or digit periods. In a microwave computer system disclosed in W. M. Goodall application Serial No. 619,435, filed October 31, 1956, now Patent 2,914,249, issued November 24, 1959, the binary "1" and "0" are represented by the presence or absence of a microwave pulse in a wave guide in a given digit period.

A general object of the present invention is the improvement of microwave computers.

Another object of the present invention is to increase the reliability of high speed computers.

An additional object of the present invention is to reduce the cost of microwave computers.

In accordance with the present invention, the different digits of a digital signal are represented by different microwave signals on a single wave guide, rather than by the presence or absence of microwave signals on the wave guide. Thus, for example, the binary symbol "1" may be represented by a microwave pulse at one frequency, and the binary symbol "0" by a microwave pulse at another frequency. Another wave guide may carry digital information at two different frequencies, and means may be provided to synchronize the timing of the two trains of signal information. Logic circuit functions may then be accomplished by the use of frequency converters, filters, and microwave junctions.

Instead of using different frequencies to represent different binary digits on a single wave guide, other techniques may be employed. Thus, for example, the binary symbol "1" may be represented by a microwave signal of a predetermined reference phase, and the binary symbol "0" by a microwave signal which is in quadrature or out of phase with respect to the reference phase. Another alternative involves the use of two or three time slots to represent each binary digit. A pulse in one time slot represents one binary digit, while a pulse in another time slot represents the other binary digit. Microwave signals could also be applied to a wave guide in different polarizations to represent different binary digits.

It is a feature of the invention that each of a plurality of digital signal generators applies microwave signals to each of a corresponding plurality of wave guides in distinctive ways to represent different digits.

It is another feature of the invention that logic circuits are coupled to a plurality of the wave guides to respond to respectively different digital combinations supplied to the wave guides by the signal generators.

In accordance with a feature of a specific embodiment of the invention, two sources of frequency shifted binary signals are coupled to a first converter, and the output of this first converter is coupled to another frequency conversion circuit to which additional beating frequencies are applied. With a properly chosen frequency conversion circuit arrangement and suitable beating frequencies, frequency shift output signals may be derived which correspond to any desired combination of input signals.

Other objects, features, and advantages of the invention may be readily apprehended by reference to the following detailed description and to the accompanying drawings, in which.

Figure 1:
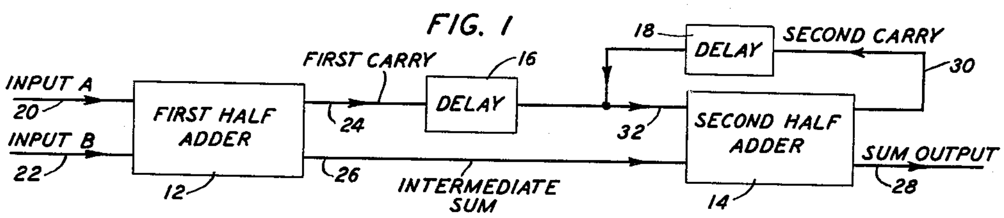
FIG. 1 is a block diagram of a serial binary adding circuit including two half-adders.

Referring to FIG. 1 of the drawings, the full adder circuit therein depicted includes a first half-adder 12, a second half-adder 14, and two delay circuits 16 and 18 associated with the carry signal channels. Two serial binary input signals A and B are applied to inputs 20 and 22, respectively. These signals are processed by the first half-adder 12 to produce a first carry on channel 24 and an intermediate sum on channel 26. The second half-adder 14 may be a duplicate of the first half-adder 12, and it produces a sum output on channel 28 and a second carry on channel 30. The first and second carries are delayed so they arrive at the input 32 to the second half-adder 14 simultaneously with the next successive intermediate sum digit on lead 26.

It will be helpful at this point to diverge from the direct description of FIG. 1 to consider some background material which will be useful in understanding the present specification. Two standard techniques employed in the analysis and development of computer and data processing logic circuitry involve the use of "truth tables" or definitive specifications of a desired circuit, and the techniques of Boolean algebra. These two techniques are discussed in some detail in a text entitled "Design of Switching Circuits" by W. Keister, A. E. Ritchie, and S. H. Washburn, published by D. Van Nostrand Company, Inc., New York, 1951. The principles of Boolean algebra and their application to the design of switching circuits is also discussed in an article by S. H. Washburn entitled "An Application of Boolean Algebra to the Design of Electronic Switching Circuits" which appeared at pages 380 through 388 of The Transactions of the A. I. E. E. Part I—Communications and Electronics, volume 72, September, 1953.

The definitive specification, or "truth table," of a half-adder appears in Table I below:

*Table I*

[Definitive specification of a half-adder]

| Input A | Input B | Intermediate Sum | First Carry |
|---|---|---|---|
| 0 | 0 | 0 | 0 |
| 1 | 0 | 1 | 0 |
| 0 | 1 | 1 | 0 |
| 1 | 1 | 0 | 1 |

In the adding of binary numbers applied to inputs A and

B, when the digit "0" is applied to both input A and input B, both the intermediate sum and the first carry outputs are also "0." When either input A or input B is "1" and the other input is "0," the intermediate sum digit is "1" and the first carry is "0." However, when both input A and input B have a signal representing a "1" applied to them, the intermediate sum digit is "0" and the first carry is "1."

The foregoing relationships can also be specified in terms of Boolean algebra. In accordance with the principles of Boolean algebra, a coincidence circuit is represented by an algebraic product, whereas a circuit which produces an output when either input is energized is represented by an algebraic sum. The last-mentioned type of circuit is often termed an "OR" circuit in logic circuit parlance. In accordance with another Boolean algebra convention, the negative of a function represented by a given symbol is represented by the symbol primed. Thus, the negative of the binary function A is the function A'. Applying the principles defined above to the definitive specification of the half-adder set forth in Table I, the following expression for the intermediate sum is developed:

$$S=A'B+AB' \quad (1)$$

Equation 1 means that the intermediate sum S is produced when input A represents the binary symbol "0" and when input B represents the binary symbol "1," or when input A is "1" and input B is "0."

Similarly, the Boolean algebraic expression for a carry is as follows:

$$C=AB \quad (2)$$

Equation 2 indicates, of course, that a carry is produced only when each of input A and input B represents the binary symbol "1."

In the foregoing paragraphs, background material has been presented which will be useful in understanding the remainder of the present specification. At this point, the detailed description of the drawings will be continued.

Figure 2:
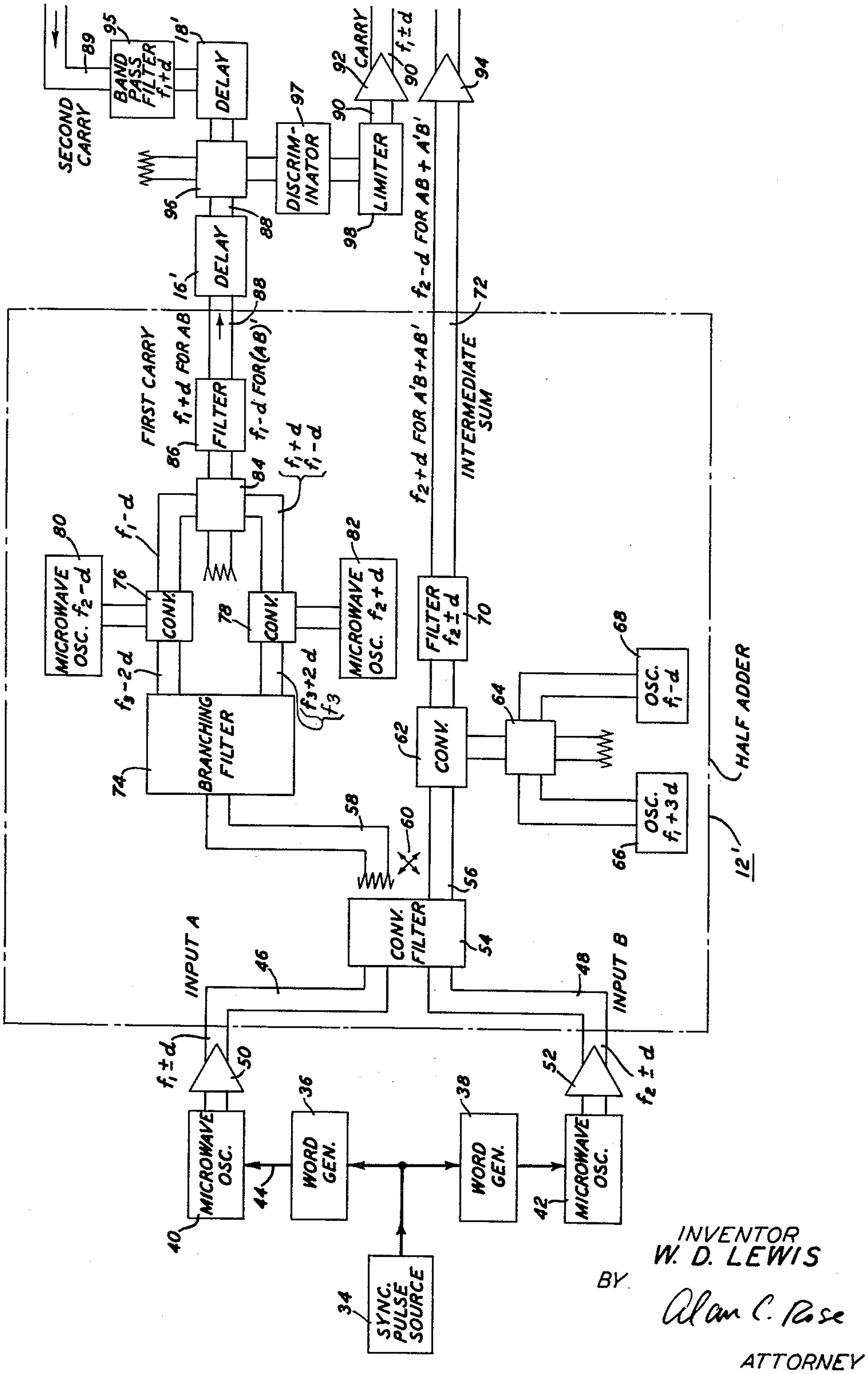
FIG. 2 is a detailed block diagram of a frequency shift binary data processing circuit in accordance with a specific embodiment of the invention.

FIG. 2, which depicts the first of several specific circuits illustrating the principles of the present invention, is a detailed block circuit diagram of a half-adder and its associated binary signal generation circuitry. The binary signals are of the frequency shift type, with the binary signals "1" and "0" being represented by microwave signals of different frequencies in the same wave guide. In the circuit of FIG. 2, the binary signal generation circuitry includes a synchronizing pulse source 34, two word generators 36 and 38, and two microwave oscillators 40 and 42.

In serial binary computers, numbers are characteristically represented by a series of electrical signals. In general, a series of time slots are established, and a signal representing a binary "0" or a binary "1" is transmitted in each time slot. The signals representing a single number appear consecutively in a group of time slots making up a longer time interval which is normally designated a "word period."

Referring to FIG. 2, the word generators 36 and 38 may each include a tapped delay line with a diode switch connected to each tap of the delay line. The outputs from the diode switches may be connected in parallel and to a control electrode of an oscillator tube associated with the microwave oscillator 40. As pulses from the synchronizing pulse source 34 pass down the delay line in the word generator 36, output pulses appear on lead 44 in accordance with the state of the diode switches at each tap along the delay line. The microwave oscillator 40 may, for example, include a reflex klystron tube, and the control pulses on lead 44 may be applied to the repeller electrode to control the frequency of oscillation. The signals on wave guide 46 at the output of the microwave oscillator 40 are therefore shifted in frequency in accordance with the control pulses on lead 44 supplied by the word generator 36. In addition, the microwave signals on wave guide 46 are grouped in "words" having a length corresponding to the number of taps on the delay line in word generator 36. The frequency of the microwave oscillator 40 is designated $f_1 \pm d$, and may, for example, be $f_1+d$ when no pulse is present on lead 44, and be equal to $f_1-d$ when a pulse is applied to the oscillator 40.

Figure 7:
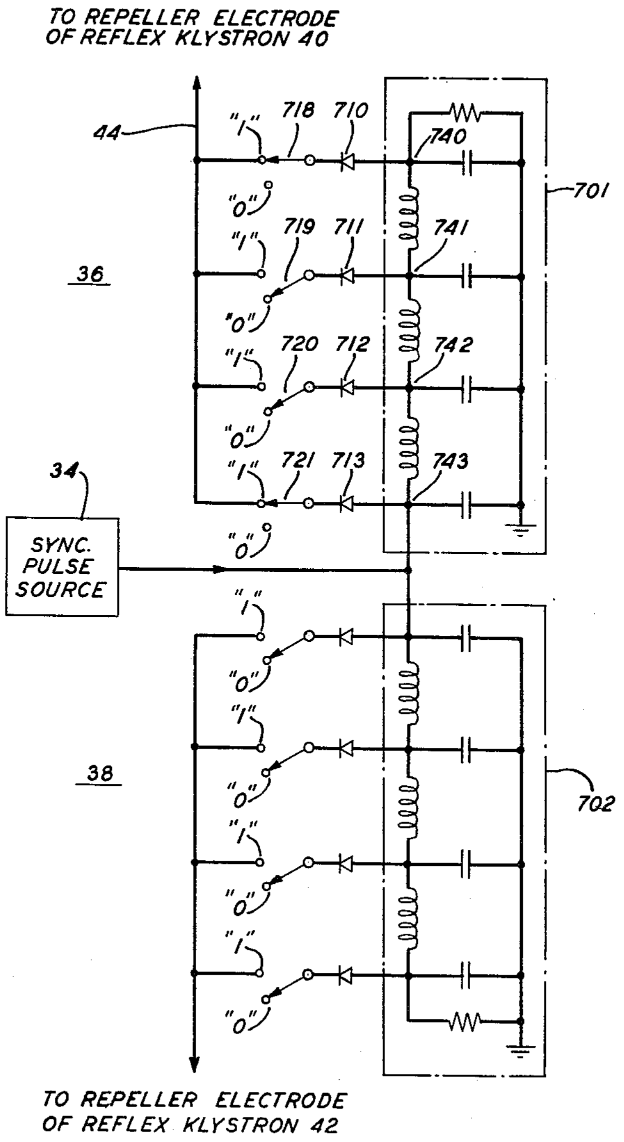
FIG. 7 is a detailed showing of a portion of the circuit shown in FIG. 2.

FIG. 7 is a detailed showing of the form which the word generators 36 and 38 may advantageously take. The generators 36 and 38 may, for example, include conventional tapped delay lines 701 and 702. More specifically, the generator 36 includes the tap points 740, 741, 742 and 743 to which are respectively connected diodes 710, 711, 712 and 713. Also, there are respectively connected to the diodes 710, 711, 712 and 713 switches 718, 719, 720 and 721. That position of a switch in which a closed circuit path is formed from its associated diode to the lead 44 is designated "1" and that position in which an open circuit path is formed from its associated diode to the lead 44 is designated "0."

Thus, as shown in FIG. 7, the switches of the word generator 36 have been adjusted so as to couple the word 1001 to the lead 44 in response to the application to the generator 36 of a single base-band pulse from the source 34. The lead 44 in turn extends to the repeller electrode of the reflex klystron microwave oscillator 40, thereby to control the frequency of oscillation thereof. More specifically, a "1" signal on the lead 44 in a given digit position produces from the oscillator 40 in the given digit position oscillations at a frequency $f_1-d$, $f_1+d$ being the frequency of such oscillations when a "0" signal is coupled to the lead 44.

The word generator 38 shown in FIG. 7 is similar to the generator 36 described above. The word output of the generator 38 also depends on the setting of the switches included therein. Illustratively, the generator 38 has been shown as coupling the word 0000 to the repeller electrode of the reflex klystron 40 in response to the application to the generator 38 of a single base-band pulse from the source 34.

The microwave oscillator 42 produces binary output signals on wave guide 48 which have frequencies of $f_2+d$ and $f_2-d$. The timing of the individual binary signals on wave guide 48 is synchronized with that of the signals on wave guide 46 by the simultaneous application of pulses from the pulse source 34 to the word generators 36 and 38. The output of the word generator 38 depends on the connections of the diode switches in word generator 38, and will normally be different from the output of word generator 36. Before application to the wave guides 46 and 48, the microwave signals may, for example, be amplified by the amplifiers 50 and 52.

For convenience, the microwave signals on wave guides 46 and 48 are designated inputs A and B, respectively. Inputs A and B from microwave oscillators 40 and 42 are connected by wave guides 46 and 48 to a combined converter and filter 54. In accordance with the known principles of converter operation, the signals applied to the converter beat with each other and would normally produce sum and difference frequencies. The converter structure itself or an associated filter is tuned to pass a band of frequencies near $f_3$, which is the sum of $f_1$ and $f_2$. With this arrangement, the difference frequencies are suppressed, and the output signals from the converter-filter 54 are either $f_3+2d$, $f_3-2d$, or exactly $f_3$, in accordance with the frequencies of the signals applied to wave guides 46 and 48. When the signal applied to wave guide 46 is $f_1+d$ and that applied to wave guide 48 is $f_2+d$, the signal at the output of the converter 54 is $f_3+2d$. When the two input signals are $f_1+d$ and $f_2-d$ or $f_1-d$ and $f_2+d$, the resultant signal will be exactly $f_3$. The third possible output signal is $f_3-2d$, which results from the application of $f_1-d$ and $f_2-d$ to the converter 54. Instead of the arrangement described above, the converter-filter structure could be tuned to a frequency band near $f_1-f_2$. Three output signals near this difference frequency would then be produced in accordance with the frequency of the input signals from sources 40 and 42.

In the foregoing paragraph, the three possible signals at the output of the converter-filter 54 have been noted. Expressed in tabular form in terms of their Boolean algebraic equivalents, these outputs are as follows:

*Table II*

| Boolean Algebraic Function | Signal Frequency |
|---|---|
| AB | $f_3+2d$ |
| AB′ | $f_3$ |
| A′B | $f_3$ |
| A′B′ | $f_3-2d$ |

These three output signals from the converter-filter 54 appear on wave guide 56, and are also coupled to wave guide 58 by the directional coupler 60. From the three frequencies available on wave guides 56 and 58, it is desired to obtain binary functions representing the intermediate sum and the first carry outputs from the first half-adder 12′. In FIG. 2, the circuit in the lower half of the block 12′ which is connected directly to wave guide 56 produces the intermediate sum output signal. The first carry signal is produced by the circuit connected to wave guide 58 which occupies the upper portion of the block 12′.

The circuit for producing the intermediate sum output signal includes the converter 62, the hybrid junction 64, two oscillators 66 and 68, and the filter 70. The oscillator 66 has a frequency of $f_1+3d$, and the oscillator 68 has a frequency of $f_1-d$. The outputs from the two oscillators are combined in the hybrid junction 64 and applied to the converter 62. The filter 70 has a narrow pass band and only passes signals between and including $f_2+d$ and $f_2-d$. With this arrangement, the input signals at frequency $f_3$ are combined with the signals from oscillator 68 and converted into $f_2+d$, while the signals $f_3+2d$ and $f_3-2d$ are both converted into the frequency $f_2-d$ in the converter 62. The mode of arriving at the difference products indicated above may be readily seen from the following Equations 3 through 5, in which frequencies at the output of the converter 62 which are outside of the pass band of the filter 70 are ignored.

$$f_3+2d-(f_1+3d)=f_2-d \quad (3)$$

$$f_3-2d-(f_1-d)=f_2-d \quad (4)$$

$$f_3-(f_1-d)=f_2+d \quad (5)$$

The output frequency on wave guide 72 representing the intermediate sum is therefore equal to $f_2+d$ when only one of the two input signals A and B represent the binary symbol "1," and is equal to $f_2-d$ when the two input signals are both "1," or are both "0."

Now, referring to the first carry circuit coupled to wave guide 58, it includes the branching filter 74, the two converters 76 and 78, and their associated oscillators 80 and 82, respectively. The output signals from the converters 76 and 78 are combined in the hybrid junction 84, and are transmitted through a filter 86 to the first carry output wave guide 88. The branching filter 76 splits up the three frequencies which may be applied to it from wave guide 58, and applies $f_3-2d$ to the converter 76, and applies both frequencies $f_3+2d$ and $f_3$ to the converter 78. The frequency of the microwave oscillator 80 is $f_2-d$. Accordingly, when the frequency $f_3-2d$ is combined with it in converter 76, the resultant signal has a frequency of $f_1-d$. The microwave oscillator 82 associated with converter 78 has a frequency of $f_2+d$. Accordingly, when it is combined with the frequency $f_3$, it also produces a signal having a frequency $f_1-d$. However, when it is combined with frequency $f_3+2d$ it produces an output signal having a frequency $f_1+d$. The output wave guide 88 coupled to the hybrid junction 84 therefore produces an output signal having a frequency of $f_1+d$ when both inputs A and B are present, and an output signal having a frequency of $f_1-d$ when any other combination of input signals is present.

As indicated in FIG. 1, the carry signals from the first and second half-adders are combined to produce the output carry signal, and this is connected to the carry input channel 32 in FIG. 1. In FIG. 2, the first carry signal appears on wave guide 88 and the second carry signal from the second half-adder (not shown) is applied to wave guide 89. The boxes 16′ and 18′ in FIG. 2 are inserted to indicate the delay of about one digit period required to synchronize the application of carry signals on wave guide 90 and the next subsequent intermediate sum signals on wave guide 72 to the second half-adder. The resultant carry and the intermediate sum output signals may be coupled to the second half-adders by suitable amplifiers 92 and 94.

The circuit for combining the first and second carry signals includes the band-pass filter 95, the hybrid junction 96, the frequency discriminator circuit 97, and the limiter 98. In operation, the circuit is designed to transmit signals at a frequency of $f_1+d$ to wave guide 90 when such signals are present either on wave guide 88 or 89, indicating a first or second carry, respectively. The signal $f_1-d$ is coupled to wave guide 90 only when there is neither a first nor a second carry.

This mode of operation is accomplished by the frequency discriminator 97 which transmits signals at the frequency $f_1+d$ with significantly greater amplitude than at the frequency $f_1-d$. When signals at the frequency $f_1+d$ are present, therefore, the limiter 98 blocks the lower amplitude signals at frequency $f_1-d$ so that only signals at the higher frequency are coupled to wave guide 90. In the absence of signals at the frequency $f_1+d$, however, the signals at frequency $f_1-d$ (indicating the absence of a carry) are coupled to wave guide 90.

The band-pass filter 95 is introduced in wave guide 89 to block carry signals from the second half-adder at the frequency $f_1-d$. This avoids the possibility of cancellation in the hybrid junction 96 by the presence of signals at this frequency from both carry channels. There is, of course, no possibility of cancellation of signals at the frequency $f_1+d$, as only a first or a second carry signal may be developed in any one digit period. To insure the elimination of signals at frequency $f_1-d$ from wave guide 88 in the presence of a carry signal at frequency $f_1+d$ from wave guide 89, a detector may be coupled to the output of filter 95 to develop a control pulse. The control pulse may be employed to shift the frequency of the oscillators 80 and 82 so that the resultant output signals are blocked by the filter 86. Alternatively, a controllable microwave attenuation circuit similar to those disclosed in the patent of W. M. Goodall cited above could be inserted in series with wave guide 88, and could be driven to the high resistance state by the control pulses.

In FIG. 2, a circuit realization for the first half-adder 12 of FIG. 1 has been set forth in some detail. It is to be understood that an additional half-adder such as that shown within block 12′ in FIG. 2 may be coupled to the output wave guides shown in FIG. 2 to produce a full adder such as that shown in FIG. 1.

Figures 3, 4, 6:
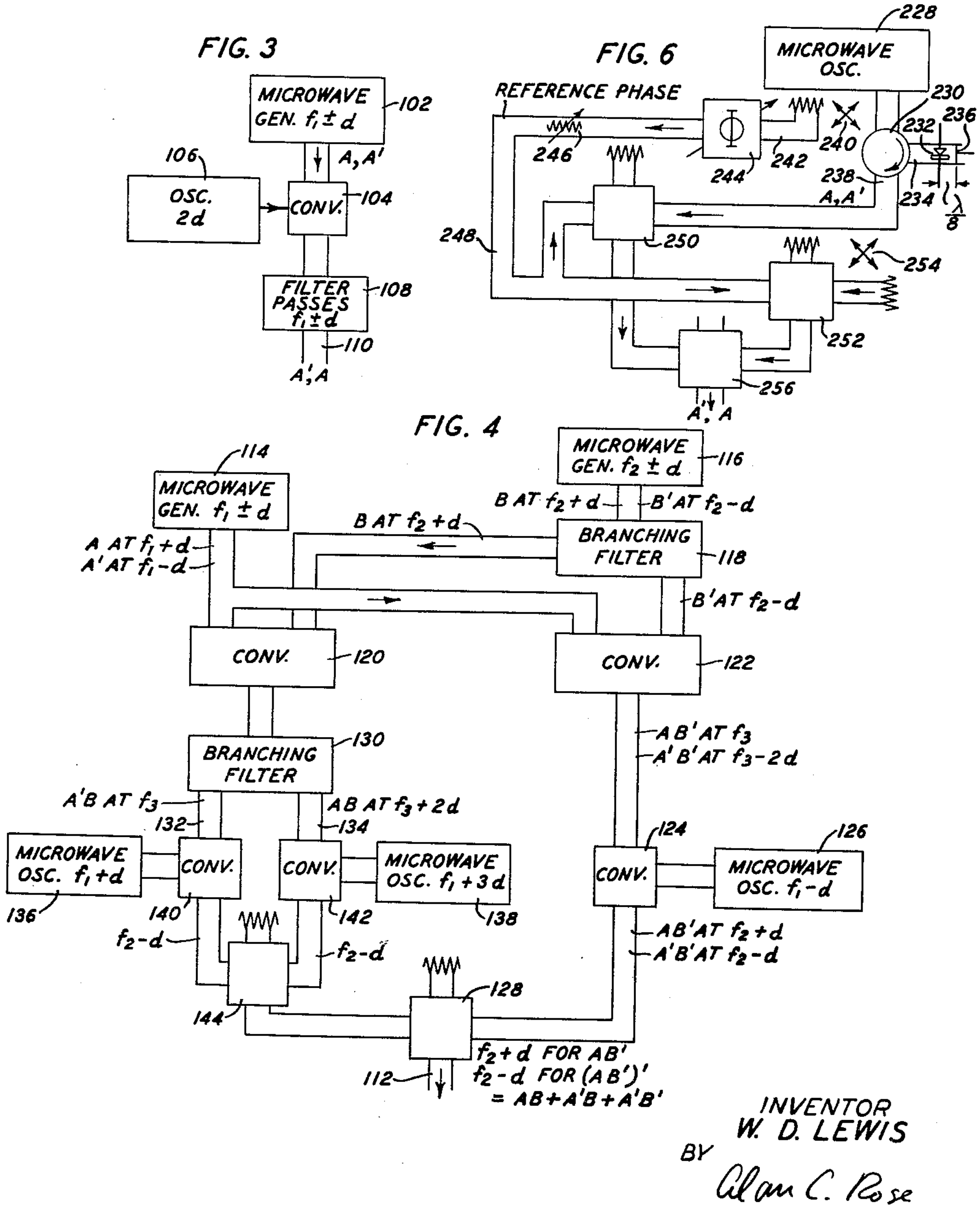
FIG. 3 is a block diagram of a frequency shift negation circuit.
FIG. 4 is a block diagram of a frequency shift logic circuit in accordance with another specific embodiment of the invention.
FIG. 6 is a block diagram of a negation circuit for a phase shift type data processing system in accordance with a further specific illustrative embodiment of the invention.

FIG. 3 is a block diagram of a negation circuit. As explained in the Washburn article cited above, a negation circuit is often useful for the construction of circuits in accordance with the principles of Boolean algebra. A negation circuit transforms the signal representing a binary "0" to a binary "1," and vice versa. Thus, for example, in a frequency shift circuit where binary digits are represented by microwave signals at frequencies $f_1+d$ and $f_1-d$, a negation circuit is required which shifts signals at one of these frequencies to the other frequency.

Referring specifically to the negation circuit of FIG. 3, it includes the microwave signal generator 102, the converter 104, an additional oscillator 106, and an output filter 108. Considering the output of the signal generator 102 to be a frequency shifted binary signal such as that produced at the output of oscillator 40 in FIG. 2, it has a frequency of either $f_1+d$ or $f_1-d$. Signals from the oscillator 106 at a frequency of $2d$ are combined with the output from the signal generator 102 in the converter 104. The filter 108 passes only a narrow band of frequencies from $f_1+d$ to $f_1-d$. Accordingly, at the output wave guide 110 the input signals at frequency $f_1+d$ have been translated to $f_1-d$, and the input signals at $f_1-d$ have been translated to $f_1+d$. In the circuit of FIG. 3, it is particularly desirable to use a balanced converter to prevent the input signals from reaching the output wave guide. Otherwise, both the desired negated output signal and the original signal would reach output wave guide 110.

FIG. 4 is another microwave logic circuit of the frequency shift type in accordance with my invention. The output at wave guide 112 of FIG. 4 is a frequency shift signal which represents the Boolean algebraic expression AB′. Thus, the output frequency is $f_2+d$ when input A is "1" and input B is "0," and the output is $f_2-d$ with any other combination of input signals.

Considering the specific circuit arrangement shown in FIG. 4, input A is developed by the microwave signal generator 114, and input B is developed by the microwave signal generator 116. It is to be understood that the microwave generators 114 and 116 include the collateral circuitry necessary to produce synchronized signals of the frequency shift type such as those which appear at wave guides 46 and 48 in FIG. 2. Additional circuit elements in FIG. 4 include the branching filter 118 and the two converters 120 and 122. Signals from the microwave signal generator 114 are applied directly to converters 120 and 122. The branching filter 118 applies signals from input B at frequency $f_2+d$ to the converter 120, and signals at a frequency of $f_2-d$ to the converter 122. With this arrangement, the output of the converter 122 representing the Boolean function AB′ occurs at the frequency $f_3$, and the function A′B′ is at the frequency $f_3-2d$. The output from the converter 122 is applied to another converter 124. An oscillator 126 having a frequency of $f_1-d$ is also coupled to the converter 124. At the output of the converter 124, therefore, the frequency $f_2+d$ represents the Boolean algebraic function AB′, and the frequency $f_2-d$ represents A′B′. These signals are coupled to the output wave guide 112 by the hybrid junction 128.

Referring now to the circuit which is coupled to the output of the converter 120, it includes a branching filter 130 which supplies the frequency $f_3$ representing the Boolean expression A′B to wave guide 132, and couples microwave signals at frequency $f_3+2d$ to wave guide 134. The signals in wave guide 134 represent the Boolean algebraic expression AB.

It has been noted above that the desired output signal AB′ produces an output signal of $f_2+d$ and that one of the three other possible combinations A′B′ produces an output signal from hybrid junction 128 of $f_2-d$. In view of the desirability of distinguishing only AB′ at the frequency $f_2+d$, the next step is to convert the signals in wave guides 132 and 134 to $f_2-d$. This is accomplished by the microwave oscillators 136 and 138 and the converters 140 and 142. With frequency $f_3$ applied to converter 140 on wave guide 132 and with the frequency of the microwave oscillator coupled to converter 140 being $f_1+d$, the resultant output difference frequency is the desired $f_2-d$. Similarly, the signal $f_3+2d$ on wave guide 134 and the signals at frequency $f_1+3d$ produced by oscillator 138 are combined in the converter 142 to produce an output signal at the frequency $f_2-d$. Signals from converter 140 or 142, depending on the digital output of signal generators 114 and 116, are coupled to the output hybrid junction 128 by the hybrid junction 144. Accordingly, the output signal at wave guide 112 is $f_2+d$ for AB′, and is $f_2-d$ for (AB′)′. This last Boolean algebraic expression is, of course, equal to AB+A′B+A′B′, and means that the output frequency is $f_2-d$ when the combination of input signals is anything but AB′.

Figure 5:
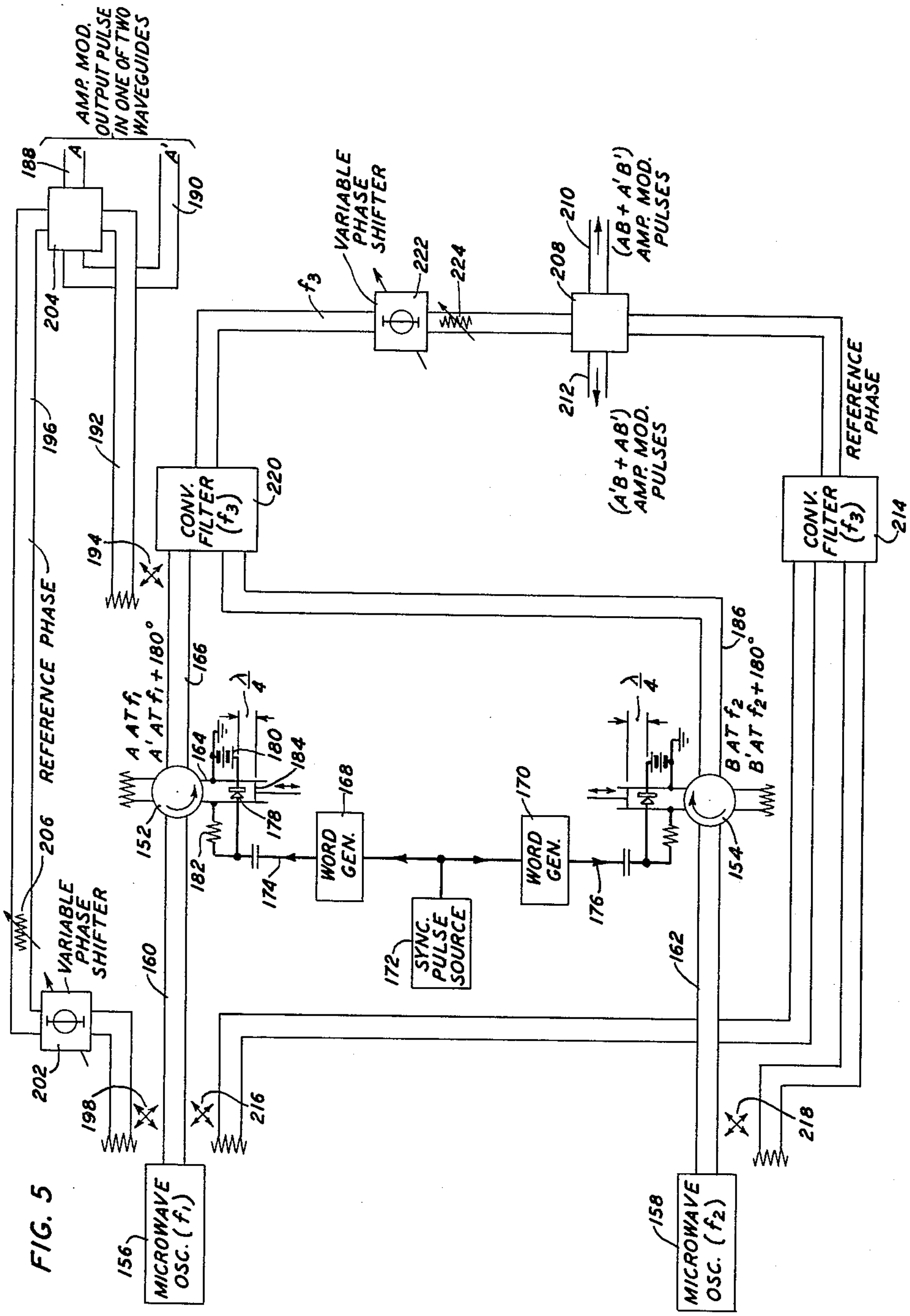
FIG. 5 is a block diagram of a serial binary logic circuit employing the phase shift of a microwave signal to distinguish between two binary digits in a wave guide in accordance with a further specific embodiment of the invention.

FIG. 5 is a circuit diagram of another form of microwave logic circuit. In the circuit of FIG. 5, digital information is represented by shifting the phase of a microwave signal. Thus, for example, the signal A may be represented by a frequency $f_1$, and A′ may be represented by $f_1+180°$. In addition, the output of the circuit of FIG. 5 may be in the form of amplitude modulated pulses.

Considering first the circuitry for generating digital pulses of the phase shift type, the circulators 152 and 154 are important components. Signals from the microwave oscillators 156 and 158 are coupled to the circulators 152 and 154 by wave guides 160 and 162, respectively. As explained in deatil in the patent of W. M. Goodall mentioned above, circulators are nonreciprocal components which transfer electrical energy to successive circuits which are coupled to it. Thus, for example, signals applied to the circulator 152 from wave guide 160 are coupled to the wave guide stub 164. Similarly, signals reflected toward the circulator 152 from the wave guide stub 164 are coupled to wave guide 166. This is, of course, contrary to the "Law of Reciprocity" which would predict coupling from wave guide stub 164 back to the wave guide 160.

The digital signal generation circuitry also includes the two word generators 168 and 170, and the synchronizing pulse source 172. The word generators 168 and 170 produce synchronized trains of pulses on leads 174 and 176 in the manner described hereinabove for the corresponding circuits 34, 36, and 38 in FIG. 2. In the absence of a pulse on lead 174, the diode 178 is biased in the high resistance direction by a circuit including the voltage source 180 and the resistor 182. Under these conditions, microwave energy coupled to wave guide stub 164 is transmitted past the diode 178 and is reflected from the conducting surface of the plunger 184. When a positive pulse is applied to diode 178 on lead 174, however, the diode is biased in the low resistance state and produces an effective short circuit across the wave guide stub 164. When the distance between the diode 178 and the plunger 184 is an odd number of quarter wavelengths, the phase of the microwave signals is shifted by 180 degrees in traversing the additional distance. Accordingly, the output from the circulator 152 on wave guide 166 is either at the frequency $f_1$ or is at $f_1+180°$, depending on the application of signals from the word generator 168. In a similar manner, microwave signals from the oscillator 158 are shifted by 180 degrees by the circuitry associated with circulator 154. The resultant digital information appears on wave guide 186 at a frequency of $f_2$ and at $f_2+180°$.

The microwave circuit which appears along the upper portion of FIG. 5 is designed to produce amplitude modulated output pulses on one of the two output wave guides 188 and 190 in accordance with the digital information on wave guide 166. The signals from wave guide 166 are coupled to wave guide 192 by the directional coupler 194. A reference microwave signal is supplied to wave guide 196 by the directional coupler 198 and the variable phase shifting circuit 202. The hybrid junction 204 may, for example, be of the "magic-T" type, or be of any other known form of hybrid junction. The wave guides 192 and 196 are coupled to one pair of conjugate arms of the hybrid junction 204. In accordance with the well known principles of operation of hybrid junctions, signals which are applied to a first pair of conjugate arms of a hybrid junction in phase are coupled to one of the two remaining arms of the hybrid junction, and when the two input signals are applied to the hybrid junction out of phase, they are coupled to the other output arm of the hybrid junction. The variable phase shifter 202 is adjusted so that the phase of the reference signal from wave guide 196 at the input to hybrid junction 204 is exactly equal to that of the signal from wave guide 192 when a pulse has been applied to the diode 178. In addition, the variable attenuator 206 is adjusted to equalize the signal levels on wave guides 192 and 196. Accordingly, a microwave pulse appears at wave guide 188 when a pulse has been applied on lead 174 from word generator 168, and a pulse appears on output wave guide 190 when the microwave signal from circulator 152 is shifted in phase by 180 degrees.

The over-all circuit which takes up the lower portion of FIG. 5 operates in much the same manner as described above. However, the output hybrid junction 208 is energized so that an output pulse appears on wave guide 210 when the digital signals represent the function AB+A'B', and apply output signals to wave guide 212 when input signals represent the Boolean algebraic function A'B+AB'. The reference phase is developed by the converter-filter 214 which derives signals from the wave guides 160 and 162 by the directional couplers 216 and 218. The converter 220 combines the output signals on wave guides 166 and 186. The variable phase shifter 222 and variable attenuator 224 provide the phase and attenuation adjustments produced by components 202 and 206 in the circuit discussed above. With this arrangement, the reference phase is in phase with the signal from the converter 220 when neither or both of the diodes associated with circulators 152 and 154 are energized. However, whe only one of the two diodes is energized, the reference phase from converter 214 is out of phase with the signal from the converter 220. Accordingly, output wave guide 210 is energized when neither or both of the two diodes are energized, and output wave guide 212 is energized when either but not both of the two diodes is energized.

FIG. 6 depicts a negation circuit for another type of binary phase shift circuit. In FIG. 6, the output signals from the microwave oscillator 228 are shifted in phase by the circulator 230 and its associated diode 232 located in the wave guide stub 234. When signals are applied to the diode 232 by a circuit such as the word generator 168 of FIG. 5, the diode 232 becomes conducting and shifts the phase of the signals reflected back to circulator 230. With the plunger 236 associated with the wave guide stub 234 spaced an odd number of one-eighth wave-lengths from the diode 232, the signals A and A' on wave guide 238 at the output of circulator 230 are shifted by 90 degrees with respect to each other. Signals from the microwave oscillator 228 are coupled by the directional coupler 240 to the wave guide 242. The phase and the level of the signal on wave guide 242 are adjusted by the phase shifting circuit 244 and the variable attenuator 246 to produce a reference microwave signal at wave guide 248.

The signals A and A' are applied directly to the hybrid junction 250, and are coupled to the hybrid junction 252 by the directional coupler 254. Similarly, the reference microwave signals are connected from wave guide 248 to other inputs to the hybrid junctions 250 and 252. The lengths of the sections of wave guide connected from wave guide 248 to hybrid junctions 250 and 252 are such that the signal A' is cancelled out in hybrid junction 250, and the signal A is cancelled in the hybrid junction 252. The length of wave guide between hybrid junction 250 and the output hybrid junction 256 is adjusted to bring the signal A, which is not cancelled out in the hybrid junction 250, to the output of hybrid junction 256 in the phase A'. Similarly, the length of wave guide between hybrid junction 252 and hybrid junction 256 is adjusted so that the signal A', which is not cancelled out in hybrid junction 252, arrives at the output of hybrid junction 256 in the phase A. In actual practice, this would mean that the length of wave guide between hybrid junctions 250 and 256 would differ from the length of wave guide interconnecting hybrid junctions 252 and 256 by an odd number of half wavelengths.

In the present description, a number of waveguide components have been designated by blocks or by conventional symbols. Some of these components include converters, filters, branching filters, circulators and hybrid junctions. Several of these components are disclosed in the patent of W. M. Goodall cited hereinabove. Typical microwave converters and filters which may be employed are disclosed in a book entitled "Principles and Applications of Waveguide Transmission" by G. C. Southworth, D. Van Nostrand Company, Inc., New York, 1950. Attention is also directed to J. W. Tukey application Serial No. 631,947, filed concurrently with the present application and entitled "Microwave Data Processing Circuits," now Patent 3,007,643, issued November 7, 1961 which is directed to a closely related invention.

It is to be understood that the above-described arrangements are illustrative of the application of the principles of the invention. Numerous other arrangements may be devised by those skilled in the art without departing from the spirit and scope of the invention.

What is claimed is:

1. In a serial binary computer circuit, a microwave adder circuit having two signal input wave guides, one carry input wave guide, and sum and carry output wave guides, means for applying microwave energy to one of said input wave guides at two different frequencies to represent two types of binary signals, means including a wave guide circuit interconnecting the carry output wave guide and the carry input wave guide of said logic circuit for supplying microwave energy to said carry input wave guide at two different frequencies to represent two types of binary signals, said microwave adder circuit including signal conversion means responsive to the binary signals applied to said input wave guides for producing sum and carry binary signals of the frequency shift type at said sum and carry output wave guides.

2. In a serial binary data processing system, a microwave logic circuit having at least two input wave guides and at least one output wave guide, means for applying microwave energy to one of said input wave guides at two different frequencies to represent two types of binary signals, means including a wave guide circuit interconnecting an output wave guide and a second input wave guide of said logic circuit for supplying microwave energy to said second input wave guide at two different frequencies to represent two types of binary signals, said microwave logic circuit including means responsive to predetermined combinations of the binary signals applied to its input circuits for producing frequency shift type binary microwave output signals on said output wave guide.

References Cited in the file of this patent

UNITED STATES PATENTS

| | | |
|---|---|---|
| 2,462,841 | Bruck et al. | Mar. 1, 1949 |
| 2,475,474 | Bruck et al. | July 5, 1949 |
| 2,498,242 | Boykin | Feb. 21, 1950 |
| 2,511,204 | Goldstine | June 13, 1950 |
| 2,513,910 | Bliss | July 4, 1950 |
| 2,561,212 | Lewis | July 17, 1951 |
| 2,590,373 | Bradley | Mar. 25, 1952 |
| 2,629,782 | Ring | Feb. 24, 1953 |
| 2,694,521 | Newman et al. | Nov. 16, 1954 |
| 2,705,752 | Pound | Apr. 5, 1955 |
| 2,735,983 | McLeod | Feb. 21, 1956 |
| 2,774,877 | Norton | Dec. 18, 1956 |
| 2,803,401 | Nelson | Aug. 20, 1957 |
| 2,815,488 | Von Newmann | Dec. 3, 1957 |
| 2,948,818 | Goto | Aug. 9, 1960 |